Sept. 2, 1941.  E. P. FELCH, JR  2,254,601
AUTOMATIC MEASURING OF CROSS TALK
Filed April 3, 1940  4 Sheets-Sheet 1

INVENTOR
E. P. FELCH, JR.
BY
ATTORNEY

Sept. 2, 1941.  E. P. FELCH, JR  2,254,601
AUTOMATIC MEASURING OF CROSS TALK
Filed April 3, 1940  4 Sheets-Sheet 2

FIG. 2

INVENTOR
E. P. FELCH, JR.
BY
H. A. Burgess
ATTORNEY.

Patented Sept. 2, 1941

2,254,601

UNITED STATES PATENT OFFICE 2,254,601

AUTOMATIC MEASURING OF CROSS TALK

Edwin P. Felch, Jr., Chatham, N. J., assignor to Bell Telephone Laboratories, Incorporated, New York, N. Y., a corporation of New York Application April 3, 1940, Serial No. 327,570

16 Claims. (Cl. 179—175.3)

REISSUED

MAR 20 1945

This invention relates to electrical measurements in intelligence transmission systems, and more particularly to a method of and apparatus for expeditiously measuring cross-talk in open-wire carrier current systems.

The relation of pairs in an open-wire line on the same row of poles brings the carrier current circuits into such close proximity to each other that some degree of cross-talk exists therebetween. The reduction of cross-talk to tolerable levels is an important factor in the development of broad band carrier systems on open-wire lines, and as cross-talk increases with frequency, it is imperative to have accurate cross-talk data for such development. From experience with lower frequency systems, fundamental coupling coefficients for common open-wire configurations have been evaluated. Computation of the systematic components of cross-talk occurring with an ideal configuration as a result of a change in the phase of cross-talk between transpositions constitutes a basis for determining the transposition of open-wire conductors embodied in carrier current systems.

The existence of dissymmetries and the extent thereof between open-wire lines can only be determined by making measurements on actual lines in the field. To obtain adequate cross-talk data so as to evaluate the random effects of small variations from ideal open-wire configurations, it would be necessary to make thousands of measurements from which the effects of sag differences, sleet, submarine sections and tree-wire could be determined. Not only would such measurements be helpful in ascertaining the accuracy of calculated transpositions but they also would be of considerable assistance in determining the feasibility of incorporating certain open-wire lines in broad band carrier systems. A realization of the magnitude of such field program may be had when it is considered that in many cases 250 cross-talk frequency curves are required for complete data on each repeater section of 60 to 100 miles in length. Point-by-point measurements are of doubtful value in ascertaining the trend of such curves unless measurements are made at a relatively large number of frequencies. Assuming 40 points to be taken for each frequency run, the number of measurements per section would be over 10,000 for a 10 to 150-kilocycle range of measurements. This would represent an extensive undertaking from both labor and time standpoints. Accordingly, this invention contemplates high-speed automatic cross-talk measuring apparatus that would both substantially expedite and simplify a study of the feasibility of certain open-wire lines for broad band carrier current systems and a check up of the accuracy of computed transpositions.

It is an object of the invention to provide apparatus for expeditiously measuring cross-talk in carrier current systems.

It is another object of the invention to provide a method of and apparatus for automatically measuring cross-talk over a range of frequencies in broad band carrier current systems.

In accordance with a preferred embodiment of the invention, alternating current energy whose frequency varies over a range within which cross-talk measurements are to be made is applied to one end of a disturbing pair in an open-wire carrier current system and a portion of such energy is passed as cross-talk to a disturbed pair extending side by side with the disturbing pair on the same row of poles. The energy received at the opposite end of the disturbing pair is utilized to control the production of other alternating current energy varying over a different frequency range and having a constant frequency difference therefrom. A portion of the other energy is heterodyned with the cross-talk received at the opposite end of the disturbed pair to produce a certain heterodyned component of constant frequency throughout the frequency range of cross-talk. This component is preferably demodulated to effect an audible alternating current component having a constant frequency and whose amplitude variations represent cross-talk at each frequency over the frequency range of the cross-talk to be measured. Suitable apparatus responsive to such amplitude variations is employed for recording or indicating purposes.

A feature of the invention is that both recording and indicating are accomplished automatically over the range of alternating current waves applied to the one end of the disturbing pair. Another feature is that while cross-talk has a different frequency at each successive instant the other alternating current waves to be heterodyned therewith also have a different frequency at each successive instant but the frequency difference therebetween is constant. Still another feature is that the response to control by the alternating current waves applied to the disturbing pair is practically instantaneous so that an immediate indication of cross-talk is secured regardless of the frequency thereof. Other features are a threshold arrangement to prevent response to spurious signals and a control of sensitivity so as to be most effective within a narrow range of frequencies.

The preferred embodiment of the invention herein disclosed will be understood by reference to the following description taken together with the accompanying drawings, in which.

Figure 1:
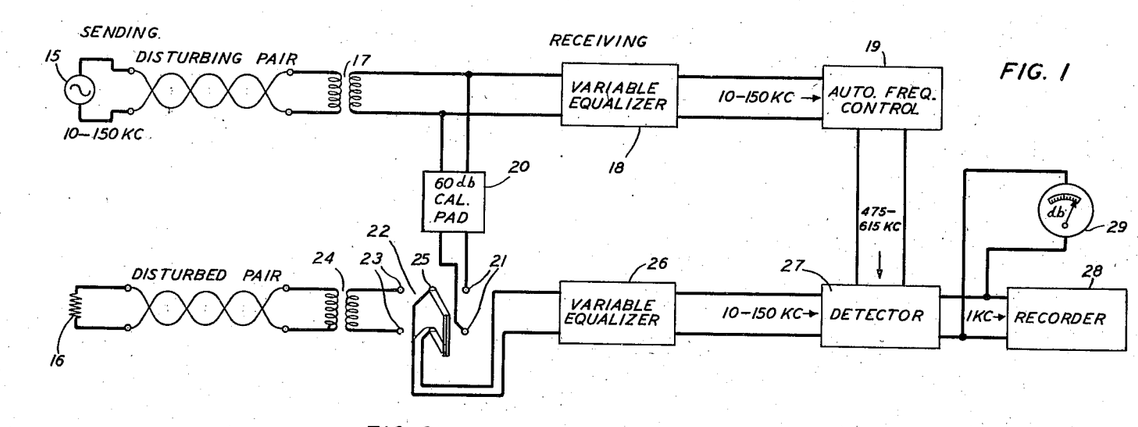
Fig. 1 illustrates schematically two pairs of conductors between which cross-talk is to be measured automatically in accordance with the invention.

Fig. 1 is a condensed schematic representation of the apparatus employed for automatically measuring cross-talk passing from a disturbing pair to a disturbed pair both of which conductor pairs extend side by side in an open-wire line on the same row of poles between a sending terminal at the left and a receiving terminal at the right. The distance between these terminals may be equivalent to a repeater section of 60 to 100 miles in length, which sections when joined together through their respective repeaters constitute a complete open-wire transmission line. Each conductor pair may accommodate a plurality of carrier channels depending on the frequency band utilized for each channel and the separation therebetween.

At the sending terminal an oscillator 15 is applied to the disturbing pair while the disturbed pair is terminated in a suitable network 16. The sending oscillator 15 is preferably a heterodyne type and is arranged to provide a constant output over a desired range which in the present illustration is from 10 to 150 kilocycles within ±0.5-decibel variation. Also, it is equipped with a motor drive so as to be driven synchronously through its range at a rate of ⅓, 1 or 3 kilocycles per second. Although not shown, the synchronous drive embodies facilities for limiting the frequency range to the desired band, a warble condenser for varying the output frequency over a 3-kilocycle band about the indicated mean value at a rate of 6 complete cycles per second, and an intermittently actuated contact for providing frequency reference marks on record paper embodied in receiving apparatus in a manner that will be subsequently explained.

The receiving terminal of the disturbing pair is connected through a transformer 17 and a variable equalizer 18 to an automatic frequency control apparatus 19 whose function will be presently described. Bridging the secondary winding of the transformer 17 is one side of a 60-decibel calibrating loss network 20 whose opposite side is connected to one pair of end terminals 21, 21 of a double-pole double-throw switch 22, whose other pair of end terminals 23, 23 is applied through a transformer 24 to the receiving terminal of the disturbed pair, and whose center terminals 25, 25 are applied through another variable equalizer 26 to the input of a heterodyne detector 27. The latter is also connected to the automatic frequency control apparatus 19. The output of the detector 27 is supplied to a recorder 28 and a visual indicator 29 in parallel, either one or both of which may be used as preferred.

Let it be assumed that initially far-end cross-talk measurements are to be made. By definition, far-end cross-talk is the ratio of signaling energy appearing at the receiving terminal of the disturbed pair to that appearing at the receiving terminal of the disturbing pair, providing the signaling energy is applied to the remote end of the disturbing pair. As the oscillator 15 is arranged to supply the measuring waves at a constant level to the sending end of the disturbing pair, it will be apparent that such level will be reduced at the receiving terminal thereof, due to the attenuation of the disturbing pair. Moreover, at the receiving end of the disturbing pair such level will not be constant, but will vary with frequency.

As the detector 27 measures only absolute levels rather than ratios, it is first necessary to modify the flat gain-frequency characteristic thereof to complement the loss-frequency characteristic of the disturbing circuit. This is accomplished by means of the adjustable equalizer 26 whose function is well understood and is described generally in the patent of Zobel, No. 1,603,305, issued October 19, 1926. This means that the level of the measuring waves supplied to the detector 27 at the receiving terminal via the disturbing pair, loss network 20 in its zero position and switch 22 in its right-hand position would be the same as if the equalizer 26 were omitted and the oscillator 15 were controlled to compensate for the loss-frequency characteristic of the disturbing pair. In either case, the result is the same, that is, measuring waves of a constant level would be supplied to the detector 27. A similar purpose is fulfilled by variable equalizer 18 disposed in the input of the automatic frequency control 19.

The recorder 28 and indicator 29 are calibrated in cross-talk units, and such readings are obtained by actuation of the calibrating loss network 20 in a manner that will now be explained. By definition, one cross-talk unit equals a 120-decibel power ratio between adjacent disturbing and disturbed pairs embodied in an intelligence transmission system. In other words, this means that for such circuits, having equal impedance, a 1/1,000,000 part of the current in a disturbing circuit is transferred to a disturbed circuit. Therefore, the loss network 20 is initially actuated so that the entire 60-decibel loss is inserted in the circuit, assuming the switch 22 is closed in the right-hand position. The gain of the detector 27 is then adjusted until a reading of 1,000 cross-talk units is produced on the visual indicator 29. Thereafter, the switch 22 is actuated to the left-hand position thereby removing the loss network 20 from the circuit and applying the disturbed pair through the variable equalizer 26 to the detector 27. The recorder 28 and indicator 29 are now both calibrated in terms of cross-talk units.

The measuring frequencies supplied by oscillator 15 are transmitted over the disturbing pair and applied through the variable equalizer 18 to the automatic frequency control 19. A portion of such energy passes as cross-talk into the disturbed pair and is applied through the variable equalizer 26 to the detector 27 whose output is divided between the recorder 28 and indicator 29. Thus, a visual representation of the cross-talk passing from the disturbing to the disturbed pair is provided by the indicator 29 which may have a multiplier, not shown, associated therewith to provide readings on scales of 1 to 10, 10 to 100, or 100 to 1,000 cross-talk units. A chart embodied in recorder 28 indicates changes in attenuation required to maintain a constant level, that is, an attenuation-time curve. This is readily translated into an attenuation-frequency curve by means of the synchronous-motor drive and an arrangement driven thereby to produce identifying marks preferably at the right-hand edge of a chart embodied in the recorder 28 in a manner that will now be described.

The arrangement for producing identifying marks on such chart is well known and briefly comprises a film driven by the synchronous motor associated with the oscillator 15 so that at predetermined intervals a perforation in the film allows the closure of an electrical contact and thereby the completion of a discrete electrical circuit, not shown, which extends between the sending and receiving terminals and embodies a solenoid and plunger both of which are associated with the recorder 28. Completion of such circuit energizes the solenoid which actuates the plunger to mark the chart. Passage of the film over the perforation serves to open the electrical contact to cause a deenergization of the solenoid which then permits the plunger to return to its normal position to await the next actuation. In this illustration, a single identifying mark is produced at each 10-kilocycle point and three successive marks at the respective 50, 100 and 150-kilocycle points. A film arrangement that may be modified to accomplish the above is illustrated in the patent of T. Slonczewski, No. 2,058,641, issued October 27, 1936.

The automatic frequency control 19 actuates the detector 27 such that as the frequency of cross-talk supplied to the latter varies at each successive instant, the detector 27 supplies alternating current waves having a predetermined constant frequency to the recorder 28 and indicator 29. In other words, as cross-talk varying from 10 through 150 kilocycles is applied to the input of detector 27, the automatic frequency control 19 is arranged to supply thereto at the same time other alternating current waves varying in frequency between 475 and 615 kilocycles and having a constant frequency difference from the 10 to 150-kilocycle cross-talk over the range thereof. The detector 27 heterodynes the respective 475 to 615 and 10 to 150 kilocycle ranges of the respective other waves and cross-talk to effect a 1-kilocycle alternating current wave which throughout the 10 to 150-kilocycle range of cross-talk is supplied to the recorder 28 and indicator 29. Thus, the automatic frequency control 19 serves to tune automatically the detector 27 over the frequency range of 10 to 150-kilocycle cross-talk so that a continuous and instantaneous measurement of the latter may be effected in terms of variations in the amplitude of the 1-kilocycle wave, either on the chart included in the recorder 28 or visually on the indicator 29.

Figure 2:
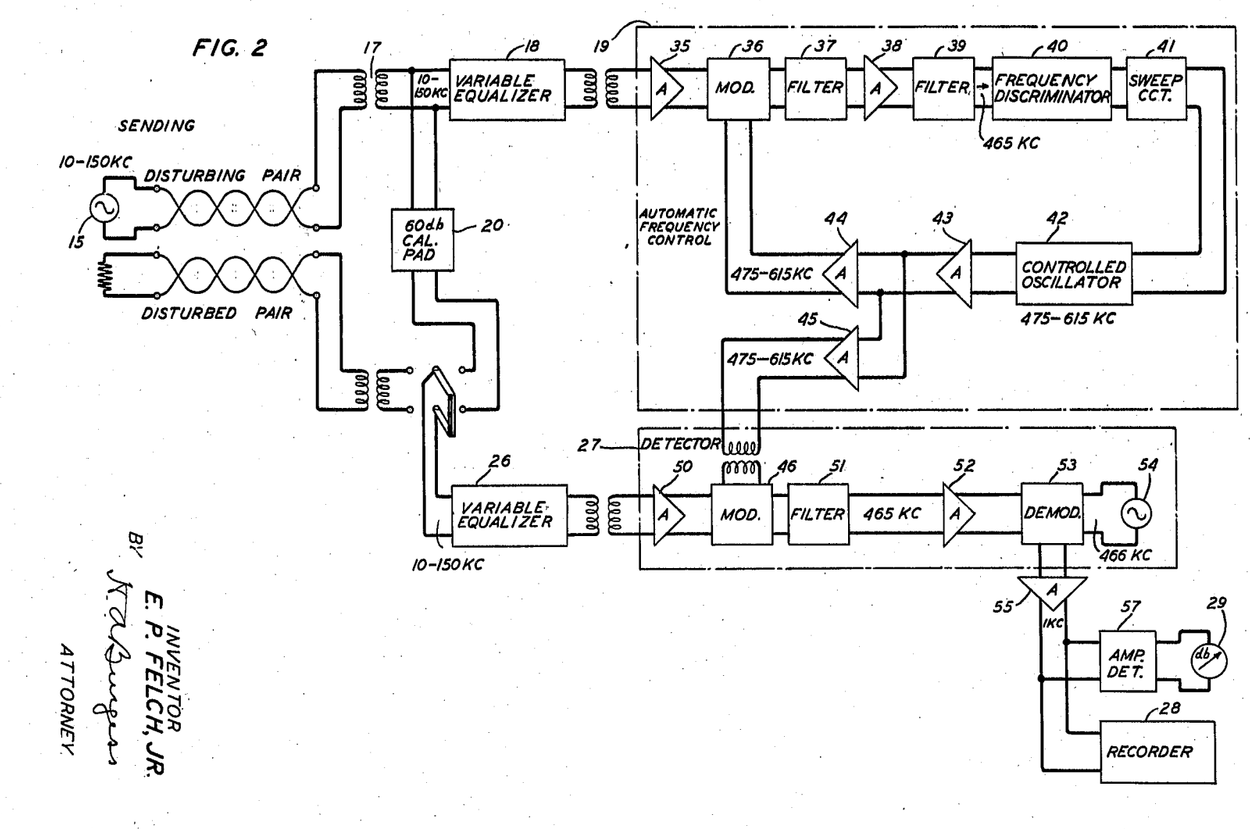
Fig. 2 is identical with Fig. 1 except that it shows the invention in greater detail.

Fig. 2 shows in further detail the organization of the automatic frequency control 19 and the detector 27. Thus it is seen that the automatic frequency control 19 includes an amplifier 35 embodying delayed automatic volume control and whose output is supplied to a modulator 36 which may be of a suitable type. From the output of the latter a predetermined modulation component may be selected by a filter 37 and applied through a constant output amplifier 38 and a filter 39 to the input of a crystal frequency discriminator 40 which controls, during certain intervals, the magnitude of a direct current voltage in response to changes in the frequency of the predetermined modulation component. This direct current voltage controls sweep circuit 41 which in turn actuates a reverse feedback oscillator 42 to produce the 475 to 615-kilocycle range of other alternating current waves in a manner that will be presently explained. These latter waves are amplified in isolating amplifier 43 whose function, in addition to amplification, is to preclude reaction of the circuits to which its output is applied upon the controlled oscillator 42.

One portion of the 475 to 615-kilocycle output of the amplifier 43 is supplied through amplifier 44 to the modulator 36 to be combined therein with the 10 to 150-kilocycle measuring waves during an interval when the latter are being received over the disturbing circuit whereby the predetermined modulation component which, in this illustration, is 465 kilocycles, is effected. Variations in the frequency of this component cause changes in the magnitude of the direct current voltage which controls the sweep circuit 41 and thereby the controlled oscillator 42 such that the heterodyning of the portion of the 475 to 615-kilocycle waves and the 10 to 150-kilocycle measuring waves in the modulator 36 tends to maintain the predetermined modulation component at the 465-kilocycle frequency. During an interval of no input of 10 to 150-kilocycle measuring waves to the amplifier 35, the frequency discriminator 40 does not affect the direct current voltage and hence exerts no influence on the sweep circuit 41. Therefore, as it will be hereinafter pointed out, the latter merely serves to sweep the controlled oscillator 42 through its 475 to 615-kilocycle frequency range in a cyclic manner. During an interval of application of 10 to 150-kilocycle measuring waves to the amplifier 35, the frequency discriminator 40 serves (a) to arrest the sweeping action of the sweep circuit 41 and (b) to control the frequency output of the controlled oscillator 42, both of which actions will be discussed in detail hereinafter.

Another portion of the 475 to 615-kilocycle output of the amplifier 43 is supplied through amplifier 45 to a suitable modulator 46 embodied in detector 27. Also, amplifiers 44 and 45 serve the additional function of reducing cross-talk between the modulators 36 and 46 at the frequencies of the measuring waves and the several heterodyned components effected thereby. The detector 27 includes amplifier 50 which is arranged with suitable networks, not shown, to reduce by negative feedback the response of the detector 27 to a 465-kilocycle component produced in a manner that will be presently mentioned. In addition, amplifier 50 embodies a network, not shown, preferably to reduce the response of the detector 27 to the upper side-band components produced in the modulator 46. Also, it is to be understood that amplifier 50 is provided with a flat frequency-attenuation characteristic. The amplified 10 to 150-kilocycle cross-talk in the output of amplifier 50 and the other portion of the amplified 475 to 615-kilocycle waves in the output of the amplifier 45 are heterodyned in the modulator 46. Thus, the automatic self-tuning of cross-talk hereinbefore referred to is effected by the automatic frequency control 19 in response to the 10 to 150-kilocycle measuring waves transmitted on the disturbing conductor pair. Manual operation may be accomplished by replacing the controlled oscillator 42 with a suitable manually controlled oscillator, not shown.

A crystal filter 51 having preferably a 100-cycle band width selects a predetermined modulation component which in this illustration has a frequency of 465 kilocycles. This component is impressed through an amplifier 52 on a demodulator 53 to be heterodyned therein with a 466-kilocycle alternating current wave furnished by an oscillator 54. From the output of the demodulator 53, a tuned amplifier 55 selects a 1-kilocycle heterodyned component which, after amplification, is utilized either in recorder 28 or in amplifier-detector 57 and visual indicator 29, both of which operate essentially along the lines shown in the patent of F. E. Fairchild, No. 1,914,414, issued June 20, 1933.

Figure 3:
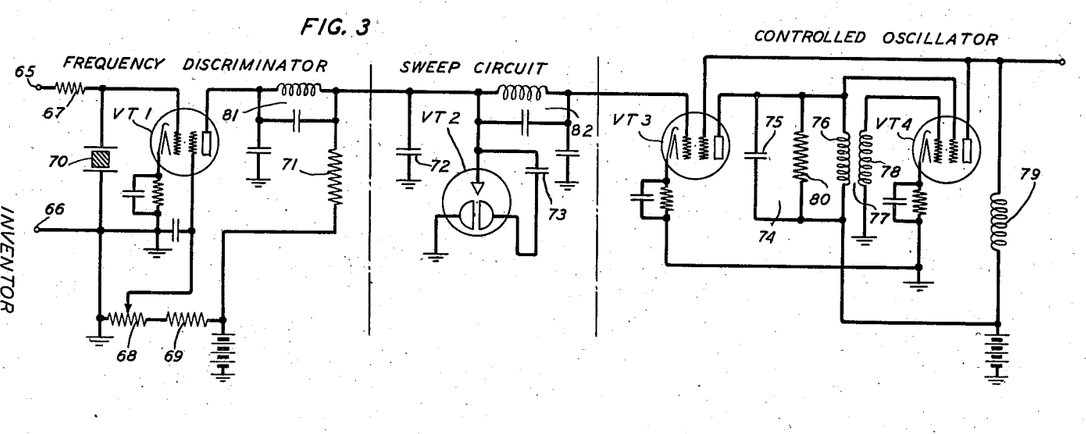
Fig. 3 represents a sensitive arrangement for automatically controlling the output of an alternating current wave generator thereby tuning the receiving terminal over a range of measuring frequencies.

The frequency discriminator 40, sweep circuit 41 and controlled oscillator 42 comprise a control arrangement to provide the waves extending from 475 to 615 kilocycles. Referring to Fig. 3, the frequency discriminator 41 includes input terminals 65 and 66 connecting a source of alternating current waves, not shown, through a relatively high resistance 67 to the input grid and cathode of tube VT1. A second grid is applied to biasing resistances 68 and 69. A piezo-crystal 70 shunts the input grid and cathode. The positive terminal of a B battery supply is impressed through a resistance 71 on the anode of VT1 whose anode-cathode circuit is connected in shunt of a sweep capacity 72 embodied in sweep circuit 41 which also embodies a cold cathode gaseous discharge tube VT2. Across one control electrode and the anode of the tube VT2 is a capacity 73 whose function will be hereinafter explained.

Controlled oscillation 42 includes a control tube VT3 and a resonant network 74 including in parallel a capacity 75 and winding 76 of an inductance 77. The resonant network 74 is applied to the anode of the control tube VT3 and the screen of the tube VT4 which screen functions as an anode. The winding 78 of the inductance 76 is connected to the control grid of the tube VT4. Disposed in the anode circuit of the tube VT4 is an inductance 79 which resonates with the circuit capacitance below the frequency of the oscillation of the circuit and hence exhibits the negative reactance characteristic of a capacitance while, at the same time, providing a direct current path in the anode current. The resonant network 74 is tuned initially to a frequency which is slightly below 475 kilocycles, principally by circuit capacitance. A resistance 80 in bridge of the winding 76 serves to provide for the inductance 77 a "Q" of substantially 5. The anode of oscillator tube VT4 is directly connected to the screen of control tube VT3. The 475 to 615-kilocycle range of waves is taken off the output electrodes of the oscillator tube VT4.

In the controlled oscillator 42 there are two parallel paths, a first path comprising the winding 78, control electrode and screen grid of the oscillator tube VT4, and the resonant network 74, and a second path embodying the anode of the oscillator tube VT4, screen of the control tube VT3, the resonant network 74 and the screen of the tube VT4. Consider now two voltages impressed on the resonant network 74 via the aforesaid two parallel paths. When there is zero phase shift between such voltages, the resonant network 74 will oscillate at that frequency at which such voltages occur. The resonant network 74 will not oscillate at the frequencies at which there is a phase shift between the voltages applied thereto through the two parallel paths mentioned above. Consequently, oscillations of the resonant network 74 are determined by a condition of zero phase shift between the two voltages applied thereto by way of the two previously pointed-out parallel paths.

The voltage applied to the resonant network 74 via the hereinbefore-mentioned second path may be varied by changing the screen grid-anode transconductance of the control tube VT3. This is accomplished by adjusting the direct current bias impressed on the control grid thereof by varying the charge on the sweep capacity 72. As previously mentioned, the resonant network 74 will oscillate at that frequency at which the two voltages supplied thereto have zero phase shift therebetween. This may be seen in Fig. 4 in which it will be observed that approximately at 64 volts applied to the control grid of the control tube VT3, zero phase shift between the two voltages supplied to the resonant network 74 via the aforedescribed two parallel paths occurs at about 500 kilocycles; and also at 85 volts applied to the control grid of the control tube VT3, a similar condition obtains at about 600 kilocycles.

Figure 4:
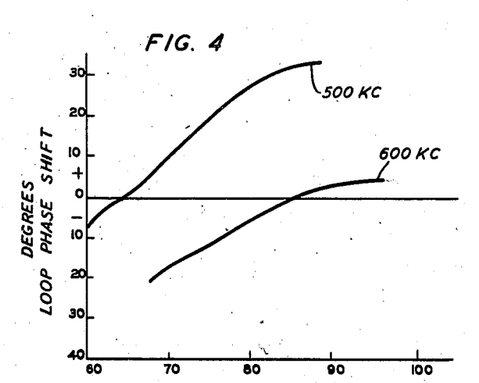
Figs. 4, 5, 6 and 7 illustrate the operation of Figs. 1, 2 and 3.
Figure 5:
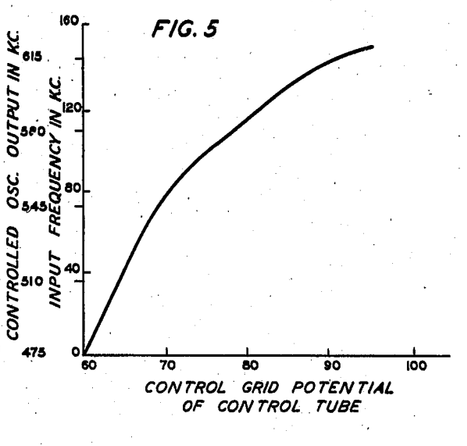

It will be understood that additional curves may be plotted in Fig. 4 to show the control grid potential of VT3 and the corresponding frequencies at which the two voltages supplied to the resonant network 74 have zero phase shift therebetween. Therefore, it will be obvious that the constants of the resonant network 74 and the potentials applied to the control grid of the control tube VT3 may be arranged such that the resonant network 74 will oscillate over a desired range of frequencies. For the purpose of this illustration a 60 to 90-volt range of grid potential for the control tube VT3 will effect in the output of the tube VT4 a frequency range which extends from 475 to 615 kilocycles. This is shown in Fig. 5.

Assuming no input is applied to the terminals 65 and 66 in Fig. 3, the sweeping capacity 72 is slowly charged through the anode resistance 71 from the B battery supply associated with the anode of tube VT1, until discharge is instituted in the gas tube VT2. Thereupon, the capacity 72 discharges rapidly through the low impedance of the discharged gaseous tube VT2 until the extinction voltage thereof is attained, whereupon the gas tube VT2 will be returned to the non-conducting condition. Thus, the cycle of charging and discharging the capacity 72 may be repeated until interrupted in a manner that will be presently explained. During each cycle, the capacity 72 effects a zero to 30-volt variation in the potential impressed on the control grid of the tube VT3. Referring to Fig. 5, it is seen that such voltage variation is adequate to sweep the controlled oscillator 42 over its frequency range of 475 to 615 kilocycles. The repetition of these cycles may be referred to as the hunting action of the sweep circuit 41. The sweep circuit constants are such that each sweep cycle is approximately one-second duration which is determined by the time required to charge the capacity 72 to the breakdown voltage of gaseous tube VT2.

During the interval of no input to the terminals 65 and 66 in Fig. 3, the screen grid of VT1 is normally biased by the voltage across the adjustable resistances 68 and 69 until the plate impedance thereof is substantially 1 megohm. Consequently, the shunt path embodying the anode-cathode circuit of VT1 has practically no effect on the charging and discharging of the sweep condenser 72 and therefore no effect on the hunting action of the sweep circuit 41. A criterion for determining the adjustment of the resistances 68 and 69 is that the sweep circuit 41 should function once per second as stated hereinbefore. Too low a bias and hence too low a plate impedance tends to reduce the voltage of the sweeping capacity 72 below the breakdown voltage of the gaseous tube VT2 and thereby to terminate the sweeping action while too high a bias tends to increase the sweep rate beyond a range of utility.

When an alternating current wave, say for example one having substantially a frequency of 465 kilocycles, is applied across the terminals 65 and 66 in Fig. 3 and thereby across the piezocrystal 70, such wave is also impressed on the input of the tube VT1. In the latter this causes a rectification action in the anode-cathode circuit. Such action serves to increase the flow of space current and to lower the impedance of the anode-cathode circuit. This results in a corresponding decrease in the impedance of the anode-cathode circuit shunting the sweeping capacity 72, as previously described. Now, the charging current supplied through the resistance 71 from the B battery source is divided between the anode-cathode circuit of the tube VT1 and the sweeping capacity 72. Consequently, the voltage across the sweeping capacity 72 is reduced to a value which is less than that required to institute discharge in the gaseous tube VT2. Hence, the hunting action of the sweep circuit 41 is arrested and therefore the gaseous tube VT2 rests in an undischarged state. Now, the voltage across the sweeping capacity 72 applied to the control grid of the control tube VT3 is entirely dependent on the frequency of the alternating current waves applied across the terminals 65 and 66.

Figure 6:
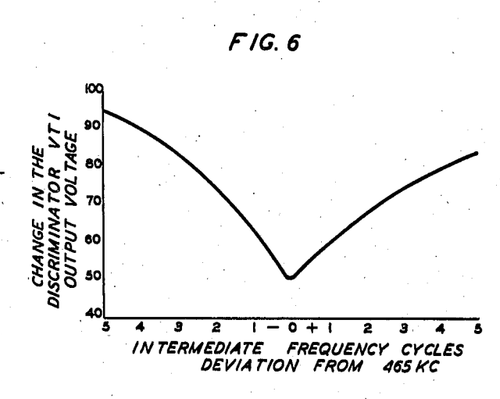

The impedance of the piezocrystal 70 between series and parallel resonance is a critical function of frequency. Assuming the voltage impressed thereon is supplied by a constant voltage source, such as the intermediate frequency amplifier 38, Fig. 2, in series with the 500,000-ohm resistance 67, Fig. 3, the voltage impressed across the piezocrystal 70 is a critical function of frequency. Accordingly, the voltage applied across the sweeping capacity 72 is also a critical function of frequency. As the voltage of the sweeping capacity 72 is impressed on the control grid of the tube VT3, the frequency of the output of the oscillator tube VT4 is therefore a critical function of the frequency of the alternating current wave supplied across the terminals 65 and 66, Fig. 3. Referring to Fig. 6, "O" point corresponds to the maximum impedance of the anode-cathode circuit of the tube VT1, occurring at the parallel resonance frequency of the piezocrystal 70, that is, at 465 kilocycles. Positive and negative variations in the 465-kilocycle frequency are reflected as further impedance variations corresponding to certain voltage changes in the grid-cathode input of the tube VT1.

The frequency discriminator 40 is so sensitive that a deviation of 5 cycles or less in the 465-kilocycle modulated component applied across the terminals 65 and 66 and thereby across the piezocrystal 70 is sufficient to provide such variation in the impedance of the anode-cathode circuit of VT1 that the variations in the charge on the sweeping capacity 72 changes the bias in the control grid of the control tube VT3 an amount that is adequate to sweep the output of the oscillator tube VT4 over its entire range of 475 to 615 kilocycles. The frequency discriminator 40 maintains the output of the oscillator tube VT4 within 5 cycles of the proper frequency over the entire range of measuring frequencies, that is, over 10 to 150 kilocycles. The control action is rapid enough to follow ±1.5-kilocycle warble six times per second. Fig. 5 shows the variations in the bias on the control grid of the tube VT3 in response to changes in the testing frequency of 10 to 150 kilocycles to provide variations in the output of the controlled oscillator 42 so that a modulated component substantially having a frequency of 465 kilocycles will be applied to the input of the frequency discriminator 40, Fig. 2.

Filters 81 and 82 in Fig. 3 comprise a 465-kilocycle rejection filter to prevent any 465-kilocycle modulated component from reaching the control tube VT3 and causing any instability thereof.

A threshold arrangement embodied in the discriminator 40 precludes the controlled oscillator 42 from tuning to any signal below a predetermined minimum level. As the 465-kilocycle component applied to the discriminator 40 has substantially a constant level effected by the amplifier 38 as hereinbefore mentioned, and as such level is several decibels above spurious signals and noise, the threshold arrangement ensures against false tuning of the controlled oscillator 42. This is so because the voltage produced across the adjustable resistances 68 and 69 so biases the screen grid of the tube VT1 in Fig. 3 that rectification in the latter cannot commence until such biasing voltage is overcome by a voltage equivalent at least to the level of a proper signal. As the level of spurious signals and noise is below that of a proper signal, it is obvious that the controlled oscillator 42 will respond only to the voltage of proper signals.

It is to be understood that the voltage applied to the input of tube VT1 need not be derived exclusively from a piezocrystal and further may be a direct current voltage as well as an alternating current voltage. For example, such voltage may be derived from phase or level sensitive apparatus, or the output of a bridge network or potentiometer circuit. In addition, acoustic, electromagnetic, photoelectric or radio pick-up devices may also be utilized to supply such voltage. Furthermore, the voltage across the sweeping capacity 72 is not necessarily limited to the control of an oscillator but with the addition of suitable intermediary apparatus may serve to balance either a bridge network or a potentiometer, to direct a steerable antenna, to control the movement of a boat, an airplane, a tank or a torpedo, and to direct the firing of a gun.

Accordingly, the field of usefulness of the discriminator 40 and sweep circuit 41 embraces, in general, such automatic control arrangements as require a supersensitive control over a range which is too wide to be covered directly by control elements of the required sensitivity. In the present illustration, the piezocrystal is extremely sensitive over a range comprising 5 cycles per second and furnishes no control above 20 cycles per second. The hunting action of the sweep capacity 72 ensures that at some instant during each sweep cycle the input voltage to the tube VT1 is within the restricted control range so that the sensitive control comprising the tube VT1 and sweeping capacity 72 may seize control of the controlled oscillator 42 in response to a voltage applied to the input of VT1, accomplishing at the same time the arresting of the hunting action of the sweep circuit 41.

The capacity 73 connected across one electrode and the anode of the gaseous tube VT2 functions (a) to store up a charge when the gaseous tube VT2 commences to discharge and to maintain such discharge for a slightly longer interval of time which means that the voltage applied to the grid of VT3 is held at its lowest value for a slightly longer interval of time, and (b) being imperfect and having a finite conductance to take a charge which is higher than that normally required to break down the gaseous tube VT2. Essentially, this has the effect of reducing the breakdown value of the gaseous tube VT2. In this illustration, the breakdown value of the gaseous tube VT2 is made substantially 110 volts and the extinction voltage about 60 volts. This provides a 50-volt differential which is more than adequate to sweep the controlled oscillator 42 over its 475 to 615-kilocycle range of alternating current waves while, at the same time, allowing sufficient B battery supply to effect the operation thereof.

Figure 7:
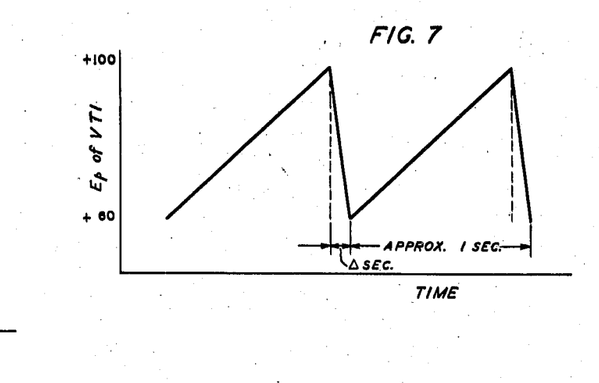

Fig. 7 shows the wave form of the sweep voltage produced by the charging and discharging of the sweep capacity 72. It is saw-tooth in form, sweeping the output of the controlled oscillator 42 over its 475 to 615-kilocycle range of frequencies, Fig. 5, at a uniform rate as the capacity 72 is being gradually charged until the breakdown voltage of VT2 is attained whereupon the capacity 72 rapidly discharges. The discharge action of the sweeping capacity 72 is sufficiently rapid to prevent control of the controlled oscillator 42 on the downward frequency sweep. The Δ-second interval represents the aforementioned time function of the capacity 73.

Accordingly, the operation of Fig. 2 is as follows:

During an interval of no transmission of the 10 to 150-kilocycle range of measuring waves on the disturbing pair and therefore an interval of no input of such waves to the automatic frequency control 19 and obviously no input to the frequency discriminator 40, the sweep current 41 is arranged to actuate the controlled oscillator 42 such that the latter produces cyclically a 475 to 615-kilocycle range of alternating current waves. Under this condition no cross-talk is present in the disturbed pair and hence no cross-talk is supplied to the heterodyne detector 27. Consequently, the automatic frequency control 19 exerts no influence on the heterodyne detector 27.

During an interval of transmission of the 10 to 150-kilocycle range of measuring waves on the disturbing pair and consequently during an interval of application of such waves to the automatic frequency control 19, the heterodyning of the 10 to 150-kilocycle measuring waves and a portion of the 475 to 615-kilocycle waves in the modulator 36 produces a heterodyned component having a frequency of 465 kilocycles, which component actuates the frequency discriminator 40 initially to arrest the hunting action of the sweep circuit 41 and thereafter by means of the latter circuit to control the frequency of the 475 to 615-kilocycle waves produced by the controlled oscillator 42. Any variation in the frequency of this 465-kilocycle heterodyned component due, for example, to a change in the frequency of the 10 to 150-kilocycle measuring waves is reflected as a change in the impedance of the anode-cathode circuit of the frequency discriminator 40 and therefore as a change of the charge on the capacity 72, which charge, as previously seen, serves to control the frequency of the waves produced by the controlled oscillator 42 such that the heterodyned component applied to the frequency discriminator 40 tends to maintain the frequency of 465 kilocycles. In other words, the frequency difference between the 10 to 150 and 475 to 615-kilocycle waves heterodyned in the modulator 36 at a given instant is substantially maintained at 465 kilocycles throughout the 10 to 150-kilocycle range of measuring frequencies.

During the same interval of transmission of the 10 to 150-kilocycle measuring waves, a portion of the 475 to 615-kilocycle waves is simultaneously supplied to the modulator 46 embodied in the detector 27 for heterodyning with the 10 to 150-kilocycle cross-talk being received thereby on the disturbed pair. The modulator 46 produces a heterodyned component having a frequency of 465 kilocycles, which component is demodulated with 466-kilocycle waves to effect an audible 1-kilocycle component whose variations in amplitude are utilized for automatically and instantaneously representing cross-talk over the 10 to 150-kilocycle range of measuring waves and whose frequency is maintained substantially constant over such range as pointed out above in connection with Fig. 1. The time interval required to complete such measurement is approximately 40 seconds. In other words, the automatic frequency control 19 serves to supply the 475 to 615-kilocycle range of alternating current waves to the heterodyne detector 27 such that at each instant during the transmission of the 10 to 150-kilocycle range of measuring waves the frequency difference between the latter and the former waves is 465 kilocycles. Thus, the automatic frequency control 19 serves to tune automatically the heterodyne detector 27 to the cross-talk waves of varying frequency such that at each instant such cross-talk is represented by a component having a constant frequency and a corresponding amplitude. The audible 1-kilocycle component is particularly useful where observations are to be made with telephone receivers. However, it is understood that the amplitude variations of the 465-kilocycle component effected in the heterodyne detector 27 may also be readily utilized in the recorder 28 and indicator 29 to represent cross-talk by tuning the amplifier 55, Fig. 2, to the frequency of such component.

Figure 8:
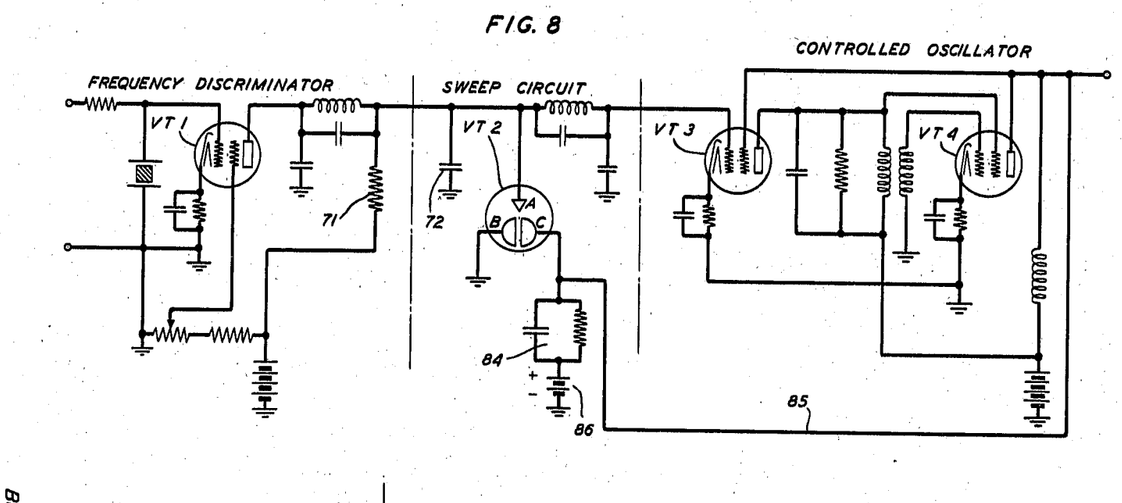
Fig. 8 shows an alternate form of Fig. 3.
Figure 9:
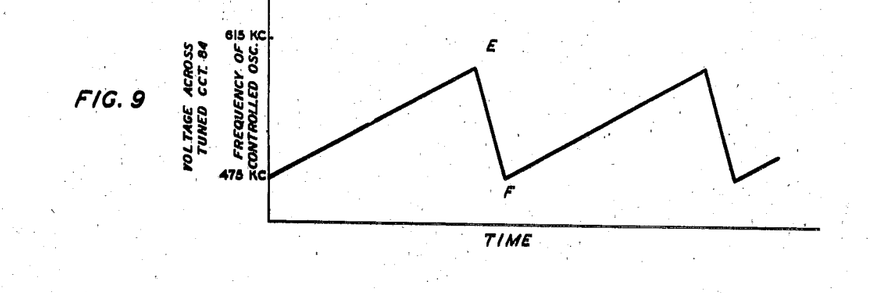
Fig. 9 represents the action in Fig. 8.

Fig. 8 shows an alternate arrangement for controlling the action of the sweep circuit 41 which action is identical with that described above in connection with Fig. 3 except in the respect that a tuned circuit 84 is connected to the control gap C—B of the gaseous discharge tube VT2 and to the output of the oscillator tube VT4 by a lead 85. The breakdown potential of the gap A—B of the gaseous tube VT2 is normally 175 volts but when a potential of 70 volts is applied across the control gap C—B, the main gap will break down at some potential above 70 volts. The sweep capacity 72 is charged through the resistance 71 until the output frequency of the controlled oscillator 42 reaches point E in Fig. 9 at which time an alternating current potential is built up across the tuned circuit 84 which potential, in addition to a biasing potential provided by a battery 86, is adequate on positive peaks to break down the control gap C—B, and hence the main gap A—B. The latter in the breakdown condition enables the capacity 72 to discharge therethrough until the point F in Fig. 9 is attained, which point corresponds to the main gap A—B sustaining potential of 70 volts. Repetition of this cycle constitutes the hunting action of Fig. 8 and the latter action continues until a signal impressed on the discriminator 40 takes control in the manner set forth above concerning Fig. 3.

Although the invention is particularly described with reference to an automatic measurement of far-end cross-talk, it is not necessarily limited thereto and may be used with equal facility to measure automatically near-end cross-talk, noise, transmission and impedance and return loss, in the latter case a portable bridge is also required. Further, it is to be understood that the invention may be readily used in accomplishing the above measurements in coaxial and square-four cables.

The illustrated apparatus is normally operated from a regulated power supply which may be either 50 or 60 cycles when such is available. In locations too remote from readily accessible commercial power supply, a portable gasoline engine-generator is adapted to furnish the required power. For field service, apparatus according to the invention, including a suitable gasoline engine-generator, is mounted on a truck or trailer, or the measuring apparatus alone may be packed in specially designed trunks and shipped to various geographical points. In view of the fact that cross-talk curves over a desired range can be drawn at least in 40 seconds, as previously pointed out, the same apparatus may be widely used over an extensive geographical area.

What is claimed is:

1. In combination, means to produce alternating current waves, means to so control said wave producing means that alternating current waves of a predetermined frequency range are produced cyclically, and means responsive initially to an input voltage to actuate said controlling means such that initially the cyclic production of said waves is arrested and thereafter responsive to variations in said input voltage to actuate said controlling means such that said waves are produced in accordance with the variations in said input voltage.

2. In combination, means to produce cyclically a voltage of a predeterminedly varying magnitude, and means to actuate said voltage producing means to arrest the cyclic action thereof and thereafter to control the magnitude of the voltage produced thereby.

3. In combination, means comprising a capacity and gaseous discharge device for producing a voltage of varying magnitude, said capacity cyclically charging to the breakdown voltage of said device and after breakdown discharging therethrough, and means responsive initially to an input voltage to limit the charge on said capacity to a magnitude less than that required to discharge said device thereby arresting the cyclic action of the voltage producing means and responsive thereafter to variations in said input voltage to control the charge on said capacity and thereby variations in the magnitude of the voltage produced by the voltage producing means.

4. In combination, means to produce cyclically a voltage of varying magnitude, said means comprising a three-electrode gaseous discharge device and a capacity connected across the anode and one control electrode thereof so that said capacity is charged to the breakdown voltage of said device and after breakdown discharged therethrough, and means to control the variations in the magnitude of the voltage produced by said producing means, said controlling means comprising a thermionic device which has its plate circuit connected in parallel with said capacity such that when no signal is applied to the input thereof the plate circuit has relatively high impedance and exerts no influence on the action of said capacity and when a signal is applied to the input thereof the plate circuit has a decreased impedance to divert therethrough a portion of the charge on said capacity thereby arresting the cyclic action of said capacity and controlling the charge thereon.

5. In combination, means to produce alternating current waves, means to control said wave producing means such that alternating current waves of predetermined frequency range are cyclically produced, said controlling means comprising a three-electrode gaseous discharge device, a capacity connected across the anode and one control electrode, a tuned circuit connected to the other control electrode, a source of biasing voltage applied through said tuned circuit to said second control electrode and circuit means to connect the output of said wave producing means to said other electrode and tuned circuit, said controlling means arranged such that said capacity is charged at a uniform rate to actuate said wave producing means to produce the predetermined range of alternating current waves which waves serve to build up a voltage across said tuned circuit until at the upper end of the predetermined frequency range such voltage causes a discharge across both control electrodes of the gaseous device whereupon discharge is instituted across the anode and the one control electrode to discharge said capacity through said gaseous device, and means responsive initially to an alternating current input voltage to actuate said controlling means such that the charge on said capacity is limited to a magnitude less than that required to institute discharge across the anode and one control electrode of said gaseous device thereby arresting the cyclic action of the controlling means and thereafter responsive to variations in the frequency of the input voltage to actuate the controlling means such that the charge on said capacity effects corresponding variations in the frequency of the produced waves.

6. The method of determining cross-talk between two conductor pairs which comprises applying to one pair alternating current waves whose frequency varies over a range within which cross-talk is to be determined, deriving from the other pair cross-talk waves resulting from the transmission of said alternating current waves over said one pair, automatically translating said cross-talk waves, under control of said alternating current waves, from varying frequency waves to a constant frequency wave representing at each instant cross-talk at a single frequency, and determining cross-talk from said constant frequency wave.

7. The method of determining cross-talk between two conductor pairs which comprises applying alternating current waves of continuously varying frequency to a first pair, utilizing said waves of said first pair to effect other alternating current waves of continuously varying frequency but having a constant frequency difference therefrom, deriving from both cross-talk in the second pair and said other alternating current waves a constant frequency component having an amplitude corresponding to the cross-talk at each frequency within the frequency range of the cross-talk to be determined, and determining cross-talk represented by said constant frequency component.

8. The method of observing cross-talk between two conductor pairs which comprises applying to the near end of a first pair alternating current waves whose frequency varies over a range within which cross-talk is to be observed, generating at the far end of said first pair other alternating current waves whose frequency varies over another range, utilizing both the alternating current waves received at the far end of said first pair and a portion of said other alternating current waves to control the generation of said latter waves such that a constant frequency difference is effected between both said waves over the frequency ranges of both thereof, deriving from the second pair at the far end thereof cross-talk resulting from the transmission of said alternating current waves over said first pair, utilizing said cross-talk and another portion of said other alternating current waves to effect automatically a constant frequency component representing at each instant the cross-talk at each frequency throughout the frequency range within which the cross-talk is to be observed, and observing the cross-talk represented by said constant frequency component.

9. The method of measuring cross-talk between two conductor pairs which comprises applying alternating current waves of continuously varying frequency to the near end of a first pair, producing at the far end of said first pair other alternating current waves of continuously varying frequency, deriving at the far end of said first pair from both the alternating current waves received thereat and a portion of said other alternating current waves a certain component which has a tendency to vary in frequency, utilizing said first-mentioned component to control the production of said other waves such that a constant frequency difference is maintained between both said waves received and produced at the far end of said first pair over the frequency ranges of both said waves, deriving at the far end of the second pair from cross-talk therein and another portion of said other alternating current waves a constant frequency component having an amplitude corresponding to said cross-talk at each frequency of the range within which the cross-talk is to be measured, and observing said cross-talk represented by said second-mentioned component.

10. In combination with two conductor pairs, means to apply to one pair alternating current waves whose frequency varies over a range within which cross-talk indications are to be made, means to derive cross-talk from the other pair, means responsive to said alternating current waves and said cross-talk to effect automatically an alternating current wave having a constant frequency and whose amplitude corresponds to said cross-talk at each frequency of the range within which the cross-talk indications are to be made, and means actuated by said constant frequency wave to indicate said cross-talk.

11. In combination with two conductor pairs, means to apply to one pair alternating current waves whose frequency varies over a range within which cross-talk is to be determined, means to utilize said alternating current waves to effect other alternating current waves whose frequency varies over another range but has a constant frequency difference therefrom, means to derive from both cross-talk in the other pair and said other alternating current waves a constant frequency wave representing at each instant cross-talk at a single frequency over the frequency range within which the cross-talk is to be determined, and means to determine the cross-talk represented by said constant frequency wave.

12. In combination with two conductor pairs, means to apply alternating current waves of continuously varying frequency to the near end of a first pair, means at the far end of said first pair to generate other alternating current waves of continuously varying frequency, means connected to the far end of said first pair and said other wave generating means and responsive to frequency variations of the waves transmitted on said first pair and a portion of said other waves to control said other wave generating means such that a constant frequency difference is maintained between both said waves transmitted on said first pair and said other waves over the frequency ranges of both thereof, means connected to the far end of the second pair and said other wave generating means to derive from the respective cross-talk and another portion of said other waves a constant frequency component whose amplitude corresponds to cross-talk at each frequency of the range within which cross-talk is to be observed, and means to observe cross-talk represented by said constant frequency component.

13. In combination with two conductor pairs, means to apply alternating current waves of continuously varying frequency to the near end of a first pair, means at the far ends of both said pairs to generate other alternating current waves of continuously varying frequency, means to derive a certain component from a portion of said other waves and cross-talk at the far end of the second pair, means to determine cross-talk represented by said certain component, and means to control said other wave generating means in response to the waves received at the far end of said first pair and another portion of said other waves such that a constant frequency difference is maintained between said waves received at the far end of said first pair and said other waves throughout the frequency ranges of both thereof and thereby to provide said certain component with a constant frequency to represent at each instant the cross-talk at a single frequency over the frequency range of the cross-talk to be determined, said controlling means comprising means for effectively applying a continuously varying actuating voltage to said other wave generating means in response to the continuously varying frequencies of both said other waves and said waves received at the far end of said first pair.

14. The combination according to claim 13 in which said controlling means embodies a threshold device that precludes spurious voltages from affecting the voltage applied to said other wave generating means, said threshold device comprising means for producing a biasing voltage whose magnitude is at least of the order of magnitude of the voltage of said waves applied to the near end of said first pair.

15. The combination according to claim 13 in which said controlling means comprises means to sweep said other wave generating means cyclically over its range of frequencies when no alternating current waves are being applied to the near end of said first pair, and means responsive initially to a voltage due to both said other waves and said waves received at the far end of said first pair to actuate said sweeping means to arrest the cyclic action of said other wave generating means and responsive thereafter to variations of such voltage to actuate varyingly said sweeping means and thereby varyingly said other wave generating means.

16. The combination according to claim 13 in which said controlling means comprises means to sweep said other wave generating means cyclically over its range of frequencies when no alternating current waves are being applied to the near end of said first pair, means to derive from both said waves received at the far end of said first pair and said other waves a certain component having a tendency to change in frequency in response to the continuously varying frequencies of both said waves, and means responsive initially to said last-mentioned certain component to actuate said sweeping means to arrest the cyclic action of said other wave generating means and responsive thereafter to the frequency variations of said last-mentioned certain component to apply a varying voltage to said sweeping means and thereby a varying voltage to said other wave generating means.

EDWIN P. FELCH, Jr.